May 25, 1965 H. P. SCHOFIELD 3,184,874
IDENTIFICATION TAGS
Filed June 4, 1963 2 Sheets-Sheet 1
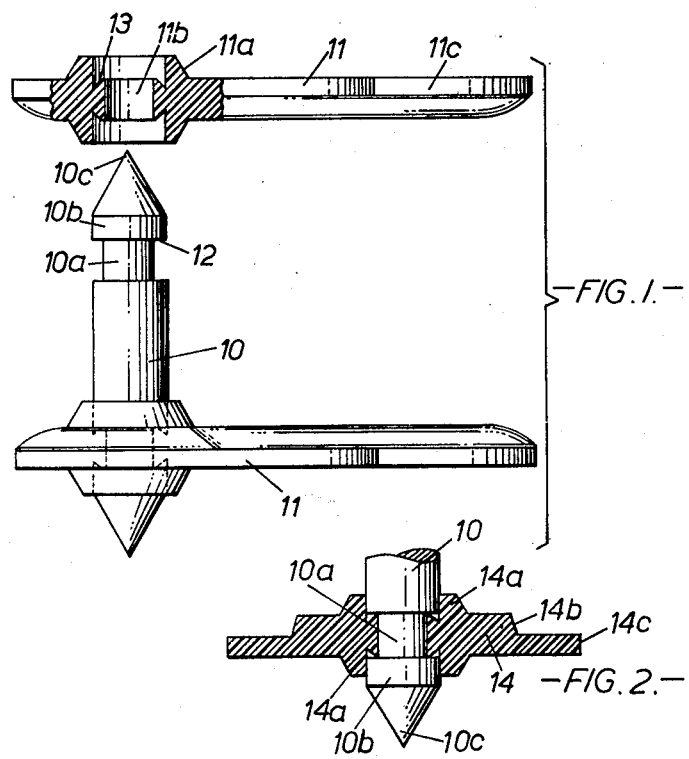
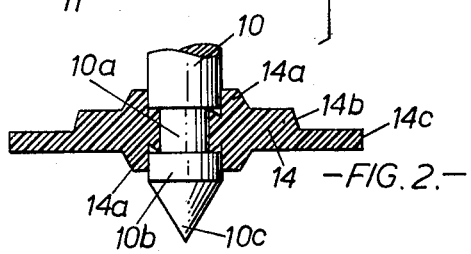
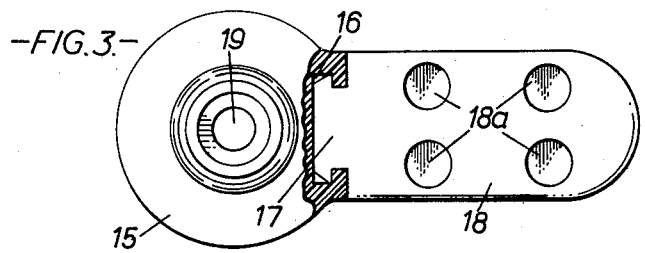
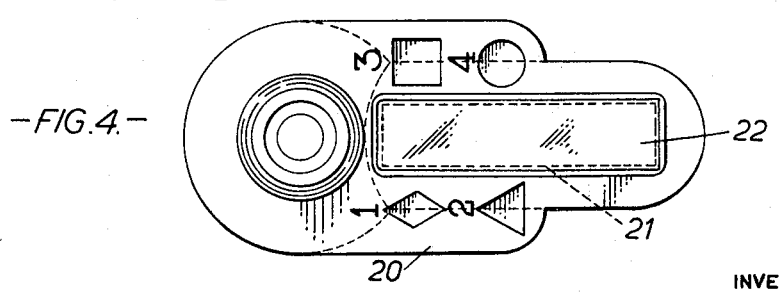
INVENTOR:
HUBERT P. Schofield
BY
ATTORNEY May 25, 1965 H. P. SCHOFIELD 3,184,874
IDENTIFICATION TAGS
Filed June 4, 1963 2 Sheets-Sheet 2
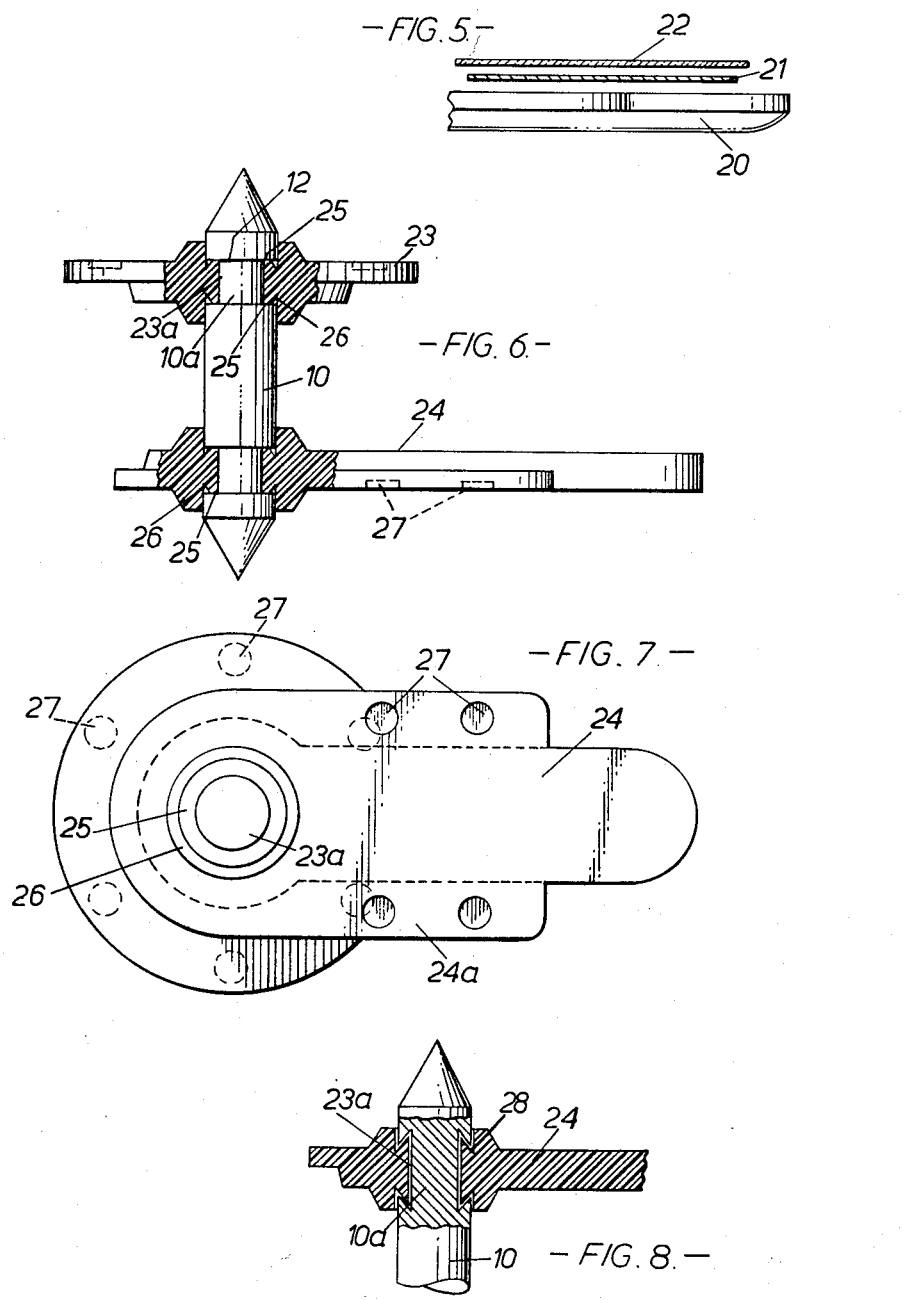
INVENTOR:
HUBERT P SCHOFIELD
BY
ATTORNEY United States Patent Office 3,184,874
Patented May 25, 1965

3,184,874
IDENTIFICATION TAGS
Hubert Percival Schofield, "Langdale," Hatchet Lane,
Windsor Forest, England
Filed June 4, 1963, Ser. No. 285,363
Claims priority, application Great Britain, June 15, 1962,
23,034/62
6 Claims. (Cl. 40—301)

The present invention relates to ear or other tags or the like identification seals for cattle, fish, birds or other animals and for articles requiring identification or data recording.

The most widely used devices for animal identification currently consist of two tags which are appropriately numbered or bear relevant data pertaining to the animal to which the tags are attached, these tags being joined by a pointed plastic pin which is forced through the skin of and flesh of an ear lobe, fin or flipper or through a wing membrane. The pin is supplied in a single piece with one tag. In use the pin pierces the flesh of the animal to which it is applied and then holds the second tag which is sprung over the point of the pin so as to be retained by the pin in the manner of an arrow head. The inside edges of both tags are usually bevelled to give a small easily slideable area next to the skin and also a surface not likely to trap foreign matter such as wire, twigs or grass. These devices are applied with pliers-like tools which hold both tags and permit the piercing of the flesh of the animal and the attachment of the tag to be performed in one operation.

In practice this form of identification has many disadvantages. Thus the cross-section of the tag not being very different from the pin (which being plastic must be of a fairly generous diameter to provide sufficient mechanical strength), there is a tendency for the tag to pull through the hole normally occupied by the pin, and this is particularly the case with tags made in one piece with their respective pins, as any twisting or pushing action imparted to that tag also revolves the pin in a manner which would be adopted if it was desired to deliberately extract the pin from the flesh. Again the pin is pointed at one end so that when pushed through flesh it only pierces and spreads it with the result that the displaced flesh must lead to a thickening around the pierced point. This and the fact that the flesh tends to grip the pin prevent free movement of at least one tag and sometimes both. It will also be appreciated that the best that could be provided in the way of a plastic point must be relatively blunt and therefore pain-producing, apart from the fact that displaced flesh and matter collect around each end of the pin and often produce festering sores. Further should an animal die, or an unscrupulous person for any reason wish to effect a change of tags, it is possible to cut the pin and remove the now free tag intact and re-use it on another animal. Still further, all plastics are hydroscopic and even the so-called non-toxic grades of plastics can produce trouble through providing germ growing media on flesh adjacent their surface through this effect; the presence of permanent foreign bodies creating pressure in the flesh must produce a tendency to unnatural developments or growths in surrounding tissue, while because of the ability of the plastic pins to bend or flex, a set of circumstances often arises where the whole device catapults out of the fixing applicators at crucial and wholly inconvenient moments.

One of the objects of the present invention is to overcome the foregoing drawbacks associated with use of the known animal tags in the production of efficient simple, yet inexpensive identification tags.

According to the present invention the identification seal comprises a pin or stud of a metal or other material of a rigid non-hygroscopic or non-toxic nature which has a neck portion adjacent each pointed end and a pair of tags of synthetic resin respectively holed for connection with said neck portions and of which either or both tags is asymmetrical with respect to its hole. The arrangement being such that when attached to a pin the tags are maintained apart by the relatively wide shank portion of the pin between its neck parts, while each tag shrouds both the neck with which it is associated and shoulders of the pin constituting the ends of the neck so as to render unauthorised separation of a tag from the pin impossible without leaving evidence of tampering.

Thus the pin may be of aluminium or stainless steel, to quote two examples, which are not affected by changes in ambient humidity or temperature as compared with plastics.

The pin or stud may be hollow with a bevelled cutting edge but preferably it is solid and pointed with a cutting edge at the base of the pointed head, to suit the user's requirements. Its form is such that it pierces cleanly with a knife cutting edge and is not under pressure after insertion, while being of relatively high tensile strength it may be of smaller diameter than if made with plastic yet still be stronger.

Again the pin or stud has a neck portion, the axial length of which is of the order of the thickness of the plastic element to which it is to be connected, and a tapered or arrow head and a shank part at opposite ends of the neck which are of substantially equal transverse dimensions. Conveniently it is circular in cross section and with the same diameter or transverse measurements along part of its length as at the widest part of the arrow head, with the exception of a short axial neck portion forming the inner boundary of the arrow head, this short neck portion retaining the plastic element in such manner that once the pin has been inserted, in a hole in the plastic element, the pin is free to revolve in said hole but relative movement of the plastic element axially of the pin in either direction can be achieved solely by damage either to the pin or to the element in the region of its hole which is sufficiently extensive as to be readily visible on inspection.

If desired, however, the pin may be of oval section, in which event its freedom to revolve is considerably restricted.

The tag arms or limbs, hereinafter referred to as tags, may be made of plastic, or of metal suitably bushed with plastic and are located at predetermined distances apart. Either or each, preferably the latter, is free to revolve around the pin. Where they are made of metal and plastic, the latter preferably constitutes the bush for receiving one end of the pin while the metallic part or limb may have a snap fit into the outer peripheral portion of the plastic bush part. The tags present suitably bevelled inside faces to the matter pierced. Their limbs may be of different lengths or shapes without involved or expensive tooling and in practice they may be marketed with one end already attached to a pin.

A tag and its pin are so dimensioned that their difference in cross-section at the junction between them does not permit the tag, when in situ, to spread and pass through the hole made by the pin.

The hole through each tag is preferably counterbored at both faces of the tag while the pin has a larger diameter along its central portion between the neck portions thereof engaged by the tags, the arrangement being such that the pin, at portions thereof which are of relatively large diameter, enters and fills the inner and outer counterbores of each tag but not sufficiently tightly as to prevent rotation of each tag around the pin, yet constitutes spacing means for maintaining the tags in their required distance apart on opposite faces of the ear or other part of the animal to which the tags are applied. This method of fixing renders the device tamper-proof as without very specialised tools it would be impossible to remove a tag without leaving disfiguring evidence.

Conveniently each tag has a shoulder on both faces of its hub or bush part which is disposed circumferentially about the pin receiving countersunk bore, this shouldered part functioning to strengthen the tag at its weakest part and also to act as a locating means for ensuring that it is correctly located in an applicator such as a pair of pliers or pincers when it is to be fitted to a pin simultaneously with the piercing of the animal part by the pin. Accordingly, the applicator is complementarily formed to receive the shoulders on the outer faces of the tags.

An applicator in the form either of a pair of pliers or pincers, or an adaptor carried in the jaws of a pair of pliers or pincers may be utilised to position the pin and tags before, during and after piercing and effect the necessary locking action.

The invention is more particularly described with reference to the accompanying drawings which illustrate several embodiments of identification tags by way of example and in which:

FIGURE 1 is a view of a pair of tags, one connected to a pin or stud adjacent one end of the latter and the other about to be connected to the opposite end of said pin, the holes for the reception of the pin being formed adjacent an end of the tag in each case.

FIGURE 2 is a section through a circular tag which may be utilised as one of a pair of special tags for connection by a pin, the other tag being of the kind shown in FIGURE 1, i.e. with a pin receiving hole adjacent one end, as distinct from centrally, of the tag.

FIGURE 3 is a view of a modified form of tag consisting of a plastic bush or hub part for the reception of the pin and a metallic limb which bears the identification data.

FIGURE 4 is a view of the outer face of a further modification showing a different shape of limb part to that of FIGURE 3 and with different forms of identification means associated with the limbs.

FIGURE 5 is a view of the limb of FIGURE 4 showing how the central identification panel thereof is made up.

FIGURE 6 is a section through a still further embodiment showing a circular tag concentrically disposed about the pin at one end thereof and an asymmetrically disposed tag at the other end, and with a modified form of seating of each tag on the pin.

FIGURE 7 is a plan view showing the inner face of the asymmetrical tag of FIGURE 6.

FIGURE 8 shows a still further modification of the seating of a tag adjacent an end of the pin.

In the embodiment illustrated in FIGURE 1, a pin or stud of rigid material, such as for example metal, or of stiff or semi-stiff material such as a hard synthetic resin appropriately treated to render it truly non-toxic, is shown at 10 and each plastic tag element to which the pin is connected is shown at 11.

The pin or stud the shank part of which is shown at 10 has a neck part 10a and a head 10b, the latter being either pointed at 10c or rounded in a manner not shown. Thus shoulders 12 are formed at the end of the head 10b where it merges into one end of the neck 10a and at the other end of the neck 10a where it merges into the shank 10.

Each plastic tag element 11 has a hub part with a ridge 11a thereon and a hole 11b therein. The wall of said hole 11b is countersunk at its ends to form internal shoulders 13 which, in the particular form shown, are undercut, the arrangement being such that the axial length of the neck 10a of the pin lies between the axial spacing of the shoulders 13 at their inner radii and the thickness of the material of the plastic element 11 at the ridges 11a, i.e. at the outer radii of said shoulders 13 while by virtue of the ridges 11a the shoulders 12 and 13 are completely hidden from view, when the pin has been inserted into the hole under the application of pressure directed axially of the pin and hole, it is most difficult to obtain access to the shoulders for the purpose of removing the pin from the hole without leaving evidence of such efforts.

In this particular embodiment the outer end 11c of each tag element is of narrower width than the remainder as is also the case with the modifications illustrated in FIGURES 4 and 7, while in cross section both the narrow and relatively wide parts of each tag may be convex on their inner faces where they are likely to contact with the skin of the animal to which the tag is applied. The tags may bear identification data in any desired manner as will be hereinafter described with reference to the modifications.

As shown in the drawings, the raised shoulders or bushes 11a are preferably formed on both faces of the tags to permit them to be inserted into an applicator with either face uppermost, while again the pin 10 is preferably pointed at both ends to facilitate providing a firm location for the applicator and also to enable the latter to be used either way with respect to a pin, thus removing an application difficulty which obtains when a pin is used which is pointed at one end only.

One of the tags may be circular as shown at 14 in FIGURE 2, the other tag having an asymmetrical bore for the reception of the pin. In this embodiment, on the inner face of the circular tag 14, i.e. that side which faces the asymmetrical tag with which it cooperates, the tag has a boss 14a and is also stepped at 14b so that the outer annulus on that face of the tag at 14c is approximately of one half the thickness at 14b and one quarter the thickness at 14a.

In the construction illustrated in FIGURE 3, the plastic hub portion 15 at one end of the tag at a part of its external periphery has a recess 16 for the reception of the head 17 of a metallic tag element 18, the hole 19 in the hub portion having shoulders and being countersunk in accordance with any of the other embodiments. The element 18 may be indented at 18a to facilitate the punching of holes which by virtue of their respective positions may represent operations of a different nature on the animal to which the tag is attached or other matter or data to be disclosed.

The tag of FIGURE 4, which may be an end view of either tag of FIGURE 1, indicates how its outer face, i.e. the face remote from the surface of the ear or other part of the animal to which it is attached, may be marked or otherwise treated after application on more than one occasion and in such a manner that the tag is capable of identifying particular data such as the nature of an operation performed on an animal to which the tags are applied. For this purpose a suitable area of plastic is provided on each tag 20, or on one of a pair of tags, which may be pierced such as by a punch or a pair of pliers or again by means incorporated in a pair of pliers. As shown in FIGURE 4 the shape of the punched hole may vary according to the nature of the data to be disclosed such as the ownership of the animal, its herd number, year of birth, sex, pedigree or again the nature of any operation which may have been performed on the animal and for this purpose the tag has portions 1, 2, 3, 4 which are punched differently, each to indicate data of a kind which differs from the others.

As with the other forms of tag, the tag 20 may be of transparent or translucent plastic and be split parallel to its faces to enable identification matter to be inserted in a slit between the split parts so that the data in question may be displayed in the manner of a window and sealed therein. Alternatively the identification matter may be indicated on a strip 21, formed or laid on the tag 20 and a separate covering transparent strip 22 applied and heat sealed thereto as shown in FIGURE 5.

A different form of bore in the hub or bush of each tag is shown in FIGURES 6 and 7 of which the former again shows an asymmetrical tag mounted at one end of the pin and a circular tag at the other end. In this embodiment the tags 23, 24 have countersunk shoulders 25 undercut at 26 by the removal of a V-shaped section of the plastic material. In consequence in any attempt to remove the pin 10 from a pair of tags 23, 24 to which it has been attached, the shoulder 12 at either end of the narrow portion of the hole 23a would tend to tighten the plastic around the small diameter neck part 10a of the pin. A suitable radius may be forced on the edges or shoulders 12 of the pin 10 to prevent cutting of the plastic and yet to be sharp enough to "dig" in and not squeeze the hole bore by spreading or distorting it. As in the construction shown in FIGURE 4 and described with reference to FIGURE 1, the free end of the asymmetrical tag 24 is of narrower width than the intermediate part thereof or the end at which a hole is formed for the reception of the pin. In this form of construction indents 27 are provided in the tag 23 and also in the relatively thin side portions 24a of the intermediate part of the tag 24 for assisting in piercing the tag to produce the identification data when required.

In the tag shown in FIGURE 8 and to further assist in the locking action between the tag and the pin, the inside longitudinal edges of the pin at its neck 10a may be undercut as shown at 28, i.e. the shoulders on the pin and those around the hole are complementary, the neck being longer on the inside than the distance between the outer edges of its bounding shoulders.

In addition to being able to revolve around the pin, the tags may be made of a material which has the ability to yield should wire, twigs, grass or the like become caught between them and the ear or other part of the animal to which they are attached. This ability to yield is also desirable to enable the tag bore to return to normal after having been forced over that part of the pin of relatively large diameter.

In practice, for one application of the present invention, namely in the manufacture and use of animal ear tags, wherein a pair of axially spaced neck portions 10a are provided on the pin 10 or stud for engagement with spaced tags, each represented by a plastic element, for the purpose of holding them apart on opposite sides of an ear of an animal, a plastic element of about 1/8" thick, with the strength and characteristics of nylon and a pin of aluminium rod 3/16" diameter have been found practical. In such event it will be appreciated that the second neck is provided adjacent the opposite end of the pin to that having the pointed tip, the head at said opposite end preferably being flat.

In use assembly may be achieved with a small manually applied pressure such as with the aid of a pair of pliers or the like device in which event the jaws of the pliers conveniently have suitable nests or locations to position the pin in relation to the plastic or other parts being fitted together before, during and after application.

In the foregoing the invention has been described with reference to specific illustrations. It will be evident, however, that variations and modifications may be made without departing from the broader scope and spirit of the invention as set forth in the appended claims. The specification and drawings are accordingly to be regarded in an illustrative rather than in a restrictive sense.

I claim:

1. An animal identification seal comprising a pin of rigid, non-hydroscopic material, and two separately formed tags of synthetic resin assembled on the opposite end portions of said pin; said pin having sharp points at its opposite ends projecting beyond the adjacent tags and annular grooves extending around said end portions of the pin and spaced from the adjacent points and from each other, each of said grooves defining a neck of reduced diameter located between shoulders, and the portion of said pin between said necks defining a shank; and each of said tags having a bore receiving the related end portions of said pin, the thickness of said tag, at least in the region of said bore, being greater than the axial extent of the related neck, said bore having a central portion of a diameter and axial extent substantially equal to the diameter and said axial extent of the neck and closely receiving the latter, and said bore having counterbores opening at the opposite sides of the tag and of a diameter equal to that of said pin immediately next to said necks to define shoulders at the ends of said central portion of the bore engaging said shoulders on the pin and shrouding the necks and shoulders of the pin for avoiding unauthorized separation of the tags from the pin without obvious mutilation thereof.

2. An animal identification seal as in claim 1; wherein at least one of said tags is asymmetrical with respect to said bore therein.

3. An animal identification seal as in claim 2; wherein the other of said tags is circular and has said bore thereof at the center.

4. An animal identification seal as in claim 1; wherein at least said shoulders of the tags are undercut.

5. An animal identification seal as in claim 4; wherein said axial extent of the central portion of said bore in each tag is slightly greater than said axial extent of said neck and the axial distance between said undercut shoulders, at the radially outer perimeter of the latter, is less than said axial extent of the neck.

6. An animal identification seal as in claim 4; wherein said shoulders of the pin are also undercut complementary to said undercut shoulders of the tags.

References Cited by the Examiner

UNITED STATES PATENTS

| 350,112 | 10/86 | Burrows | 40—301 |
| 2,940,199 | 6/60 | Goldberg | 40—301 |

FOREIGN PATENTS

| 77,589 | 8/19 | Austria. |
| 644,354 | 7/62 | Canada. |
| 15,055 | 1892 | Great Britain. |
| 15,280 | 1903 | Great Britain. |
| 161,270 | 4/21 | Great Britain. |
| 71,777 | 2/16 | Switzerland. |

JEROME SCHNALL, *Primary Examiner.*